March 21, 1972     J. NICHOLS ET AL     3,651,204
HYDROTHERMAL TREATMENT OF COLLAGEN SUTURES
Filed Oct. 2, 1969
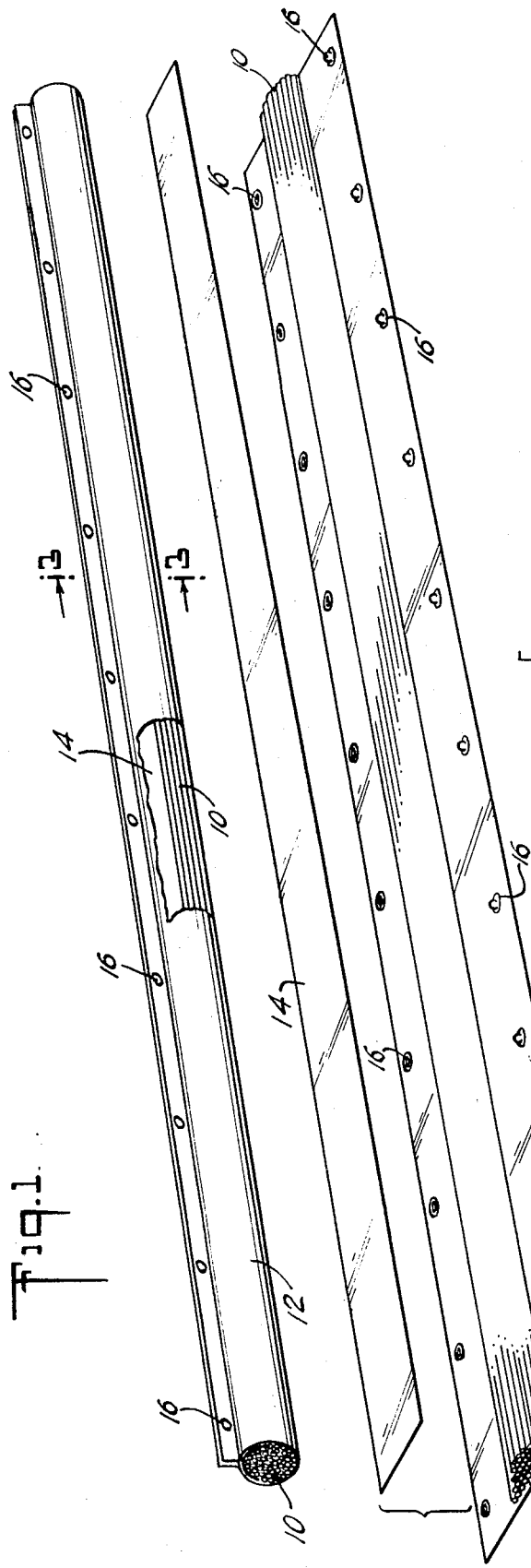
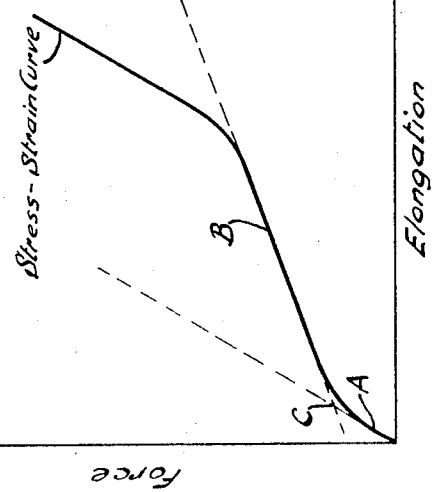
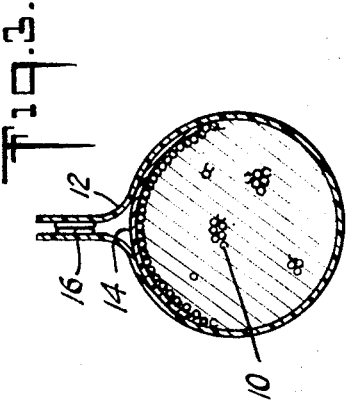
INVENTORS:
JOSEPH NICHOLS
FREDERICK H. SEXSMITH
BY
ATTORNEY.

United States Patent Office 3,651,204
Patented Mar. 21, 1972

3,651,204
HYDROTHERMAL TREATMENT OF COLLAGEN SUTURES
Joseph Nichols, Princeton, N.J., and Frederick H. Sexsmith, Erie, Pa., assignors to Ethicon, Inc., Somerville, N.J.
Filed Oct. 2, 1969, Ser. No. 863,133
Int. Cl. B29c 25/00
U.S. Cl. 264—342
22 Claims

ABSTRACT OF THE DISCLOSURE

The pliability and "hand" of an extruded tanned collagen suture is improved by immersing the strand in an aqueous medium for a time sufficient to shrink the suture about 2%–6% of its initial length. After the hydrothermal treatment, the collagen strand is dried and heated at a temperature of about 110° C. to 149° C. for about an hour.

BACKGROUND OF THE INVENTION

The present invention relates to extruded collagen strands that have utility as absorbable sutures and more particularly to collagen sutures manufactured in accordance with the procedure described in U.S. Letters Patent No. 3,114,372 and No. 3,166,074. More specifically, the present invention is directed to a method of improving the pliability and "hand" of extruded collagen sutures that have been tanned with either formaldehyde (plain tanned collagen sutures) or chromium (chrome tanned collagen sutures).

For many years, the entire production of absorbable sutures and ligatures was made from sheep or beef gut by a process that was time-consuming and expensive. Attempts to prepare collagen strands from other collagen sources were unsuccessful prior to the discovery of methods that enabled one to disperse the collagen fibrils under conditions that avoided solution or degradation. The knowledge of methods for preparing dispersions of acid-swollen collagen fibrils has now made is possible to extrude reconstituted collagen filaments of excellent tensile strength. Such extruded collagen sutures when properly tanned are superior in many respects to "catgut" produced from sheep or beef intestines.

It is recognized that stretching an extruded collagen monofilament orients and aligns the collagen fibrils and increases the tenacity of the filament while reducing its flexibility and impairing the handling qualities. The smaller size extruded collagen monofilaments (size 6/0 through 4/0) have excellent tensile and knot strength and good "hand." However, the large size sutures (size 3/0 and above) because of their size, and greater stiffness, were more difficult to tie down. As a result, some surgeons have expressed the opinion that the larger size extruded collagen sutures (size 3/0 and above) did not feel and tie the same as chrome tanned "catgut."

SUMMARY OF THE INVENTION

It is an object of the present invention, therefore, to improve the flexibility of the larger size (size 3/0 and above) extruded tanned collagen sutures. In accordance with the present invention, this is accomplished by a hydrothermal treatment. The suture is immersed under zero tension in water or an appropriate hydrating medium until the strand shrinks from about 2% to about 6% of its tensile length. The temperature of the water may vary from room temperature or below to about 65° C. but the use of warm water is preferred because the warmer the water the shorter the immersion time to obtain the desired shrinkage.

This controlled shrinkage of a collagen suture is not to be confused with the hydrothermal shrinkage that will occur when collagen is heated to its "shrinkage temperature," or $T_s$. As pointed out by K. H. Gustavson in his book on the Chemistry and Reactivity of Collagen, the mammalian collagen that is derived from skin or tendon will contract sharply to about ⅓ to ¼ of its initial length in contact with water of 60° C.–70° C. Extruded collagen sutures that have been tanned have a somewhat higher $T_s$, but it will be understood that the 2%–6% shrinkage that is critical to the practice of the present invention is obtained at temperatures that are always below the "shrinkage temperature" of the tanned collagen suture, i.e., below about 65° C.

In accordance with the present invention, chrome tanned collagen strands are shrunk about 3%±1% of their initial length and plain tanned collagen strands are shrunk about 4%±2% of their initial length by immersing under zero tension in water or an aqueous solution of a salt or a water miscible organic liquid. The hydrothermally treated strands are then dried and heated for about one hour in the temperature range of about 110° C. to about 149° C. Plain tanned collagen strands are heated at a somewhat lower temperature, i.e., 110° C.–137° C.

The time of immersion is related to the size (diameter) of the collagen suture, the temperature of the aqueous solution and the nature of the tanning. Size 3/0, 2/0, and 0 chromic sutures are preferably immersed for about 20 minutes in water at 50° C. and size 1 and 2 chromic sutures are preferably immersed for about 30 minutes in water at 50° C. At temperatures above 50° C. the time of immersion may be reduced, but as pointed out above, the temperature of the water should not be so high as to approach the "shrinkage temperature."

The uniform and smooth surface that is characteristic of the extruded collagen suture may be adversely affected if the time of immersion is too long. Consequently, the extruded suture should not remain immersed in the water for a longer time than is necessary to obtain the desired shrinkage. Plain tanned collagen strands may be treated at temperatures in the range of 20° C.–30° C. for about 5 to 10 minutes with noted improvement in pliability.

Following the warm water treatment, the collagen strand is air dried and any residual moisture is removed by gradually heating from room temperature to about 110° C. The completely dry suture is then heat set in an oven maintained at a temperature in the range of from about 110° C. to about 149° C. for one hour. This final heating step further improves the "hand" of the suture. The resulting product has pliability characteristics similar to that of chrome tanned "catgut."

If the final heat setting step is conducted at a temperature above about 149° C., the tensile strength of the suture is adversely affected. If the final heat setting step is conducted at a temperature substantially below about 110° C. the improvement in pliability and "hand" is less pronounced.

Although the handling characteristics of a suture are difficult to define in objective terms, a suture should not be wiry or stiff and should remain in the position in which it is placed until moved by the surgeon. The marked improvement in pliability resulting from the present invention may be related to three different physical properties; Young's Modlus, which is a measurement of flexibility; plastic flow, which is a measurement of extendability, and yield stress data. The method of determining these characteristics and their correlation with pliability are described in the examples.

DESCRIPTION OF THE DRAWINGS

The invention will appear more clearly from the following detailed description when taken in connection with the accompanying drawings, which show by way of example, preferred embodiments of the inventive idea.

Referring now to the drawings:

FIG. 1 is a perspective view of a bundle of collagen strands held together as a unit by a container;

FIG. 2 is a perspective view of a bundle of collagen strands in position for wrapping in a container;

FIG. 3 is a cross-sectional view of the container on the line 3—3 of FIG. 1; and FIG. 4 is a reproduction of a stress-strain curve, obtained by applying stress at a constant rate to a collagen strand that has been treated in accordance with the present invention.

DESCRIPTION OF THE PREFERRED EMBODIMENT

The starting material for the process of the present invention is extruded and tanned collagen strands, which are large in diameter (sizes 3/0, 2/0, 0, 1, and 2) and are characterized by inadequate pliability. Such large diameter collagen strands are manufactured from collagen tape which is ribbon-like in form and made up of from about 118 to about 500 individual collagen multifilaments that are bonded together. The mechanical handling of the collagen tape as it passes through the different tanning solutions and is dried and twisted to form a round strand of uniform cross-section is illustrated and described in U.S. Patent No. 3,166,074.

The hand and pliability of tanned finished collagen sutures prepared as described above is improved by immersing the sutures under zero tension in water which may be heated to a temperature that is below the "shrinkage temperature" of the suture. Preferably, the size 3/0, 2/0, and 0 sutures (chrome tanned) are immersed for 20 minutes and the size 1 and 2 sutures are immersed for 30 minutes in water maintained at about 50° C. Plain tanned collagen sutures are immersed for shorter periods of time, i.e., about 3–10 minutes in water maintained at about 20° C. to about 35° C. Inasmuch as the collagen strands are not subjected to tension during the warm water treatment, relaxation occurs with some decrease in the length of the strand. Plain tanned sutures will shrink about 4%±2%, and chrome tanned sutures will shrink about 3%±1%. The sutures are then dried and heated for 1 hour at a temperature in the range of 110° C. to 149° C. (preferably 125° C.–137° C.). The invention will be better understood from the following examples which illustrate preferred embodiments of the inventive idea. Throughout the specification, all quantities are expressed in parts by weight unless otherwise indicated.

It has been noted that the pliability of a collagen suture may be correlated with its behavior under stress. The physical tests that are used to reliably evaluate the subjective characteristics of "hand," flexibility, and extensibility are described in Example I.

EXAMPLE I

All viscoelastic measurements reported in the tables are made on a Table Model Instron Tensile Tester using a Type C Tension Cell; full-scale range 1 to 50 pounds. The measurements are made in an air-conditioned laboratory at 72° F. and 50% relative humidity. To hold the specimen suture strand, two line contact jaws are used. The sutures are tested immediately after removal from tubing fluid (90% isopropanol, 10% water). The diameter of the strand is measured to 0.0001 inch and the area of the strand is calculated. A 10 inch sample is placed between the jaws and both jaws closed, under 20 p.s.i. air pressure. The area compensator on the Instron Tester is set for the correct diameter of the suture (to give a read-out in p.s.i.) and the strand is elongated at a constant rate to 112.5% of the original length (preset on the Instron). The Instron machine is operated at a cross-head speed of 5 inches per minute and a chart speed of 20 inches per minute.

Stress-strain curves produced under these conditions have the general shape illustrated in FIG. 4. Young's Modulus (p.s.i.×10$^{-5}$) is the initial modulus as determined from the slope of the curve A of FIG. 4. Young's Modulus measures the elastic component of a suture's resistance to stress and is related to the flexibility of a suture.

Plastic flow (p.s.i.×10$^{-5}$) is the viscoelastic modulus as determined from the slope of the curve B of FIG. 4. It measures the plastic component of a suture's resistance to stress and is related to the "give" a suture exhibits under a force in excess of the yield stress.

The yield stress (p.s.i.×10$^{-4}$) is the first point of inflection in the stress-strain curve or the point of intersection C of the slopes A and B of FIG. 4. Yield stress measures the force required to initiate viscoelastic flow and is related to the straightenability of a suture.

Typical pliability data as determined from the stress-strain curves of commercially available catgut is summarized in Table I.

TABLE I.—PLIABILITY VALUES CATGUT

| Size: | Young's modulus (×10$^{-5}$ p.s.i.) | Plastic flow (×10$^{-5}$ p.s.i.) | Yield stress (×10$^{-4}$ p.s.i.) |
|---|---|---|---|
| 3/0 | 4.1±0.6 | 1.5±0.8 | 5.6±1.2 |
| 2/0 | 4.1±0.6 | 1.6±0.8 | 5.6±1.2 |
| 0 | 4.1±0.6 | 1.2±0.9 | 5.6±1.2 |
| 1 | 3.6±0.6 | 1.2±0.9 | 5.6±1.2 |
| 2 | 3.6±0.6 | 1.2±0.9 | 5.6±1.2 |

EXAMPLE II

A size 3/0 collagen tape containing 188 individual filaments is chrome tanned in accordance with the general procedure described in Example I of U.S. Pat. No. 3,166,074 by immersing the tape for 1 minute in a solution containing 0.20 percent by weight pyrogallo and 1.1 percent by weight chromium as chromic oxide having the following composition:

| | Parts |
|---|---|
| $Cr_2(SO_4)_3 \cdot X\ H_2O$ (18–21% Cr) | 897.28 |
| NaOH | 103.19 |
| Pyrogallic acid | 45.42 |
| Water qv. | 22,711.80 |

The collagen tape is dried as it leaves the tanning bath and wet out prior to twisting with an aqueous solution containing 1.5% sodium carboxymethylcellulose and 0.10% formaldehyde. The wet tape is false twisted while wet to form a round strand that is dried at 125° F. for 4.8 minutes. This strand is then finished by immersing for 49 seconds in an aqueous emulsion of 0.95% dehydrated castor oil; 0.24% gelatin; and 0.07% formaldehyde. The dehydrated castor oil coated strand is dried for 4.8 minutes at 150° F. taken up on a drum 40 inches in diameter and subsequently cut into 5-foot lengths.

Referring now to FIGS. 1–3, the individual suture strands are aligned in parallel and placed on a sheet of polyethylene terephthalate film 12 as best illustrated in FIG. 2, to form a bundle about 60 inches in length and 4 inches in diameter. An interliner 14 is placed over the bundle. The longitudinal edges of the film are wrapped around the collagen sutures and the interliner to form a container that is closed by pressing together the snap fasteners 16 as illustrated in FIGS. 1 and 3, taking care that the interliner is retained in position at the top of the bundle between the collagen sutures and the snap fasteners. This bundle of the finished collagen sutures is stored at 75° F. and 40–45% relative humidity for one to two weeks. It is then treated with warm water by immersing the entire bundle in water maintained at a temperature of 50° C. for 20 minutes. The bundle of sutures is removed from the warm water and dried in an oven by heating from room temperature to 137° C. over a period of 8 hours. The bundle of sutures is maintained at a temperature of 137° C. for a period of one hour, and then permitted to cool to room temperature. The physical properties of the product so obtained are summarized in Table II.

EXAMPLE IV

A size 2/0 collagen tape containing 192 individual filaments is chrome tanned in accordance with the general procedure described in Example I of U.S. Pat. No. 3,166,-074 by immersing the tape for 1 minute in a solution containing 0.20 percent by weight pyrogallo and 1.1 percent by weight chromium as chromic oxide having the following composition:

TABLE II

| Experiment No. | Number strands in sample | Diameter (mils) | Dry knot (pounds) | Wet knot (pounds) | Young's modulus ($\times 10^{-3}$ p.s.i.) | Plastic flow ($\times 10^{-3}$ p.s.i.) | Yield stress ($\times 10^{-3}$ p.s.i.) |
|---|---|---|---|---|---|---|---|
| 1 | 50 | 12.3 | 4.0 | 3.2 | 3.1 | 1.6 | 3.8 |
| 2 | 50 | 12.6 | 4.4 | 3.6 | 3.1 | 1.6 | 4.0 |
| Average of 2 experiments | | 12.5 | 4.2 | 3.4 | 3.1 | 1.6 | 3.9 |
| Catgut | | 12.3 | 3.8 | 4.55 | 4.1 | 1.5 | 5.6 |

EXAMPLE III

A size 3/0 collagen tape containing 188 individual filaments is plain tanned in accordance with the general procedure described in Example II above by immersing the tape for 1 minute in a solution containing 1.0 β-resorcylic acid and 0.75% aluminum formo acetate having the following composition:

|   | Parts |
|---|---|
| Methanol | 151 |
| β-Resorcyclic acid | 19.93 |
| Aluminum formo acetate | 1.42 |
| Sodium formo sulfoxylate | 0.95 |
| Disodium ethylene-diamine tetraacetic acid | 0.95 |
| Water qv. | 2032.00 |

Collagen tape is dried as it leaves the tanning bath and wet out prior to twisting with an aqueous solution containing 1.5% sodium carboxymethylcellulose and 0.20% formaldehyde. The wet tape is false twisted to form a round strand, wet out again in an aqueous solution containing 0.20% formaldehyde and dried at 125° F. for 4.8 minutes. This strand is then finished by immersing for 49 seconds in an aqueous emulsion of 0.95% dehydrated castor oil; 0.20% gelatin; and 0.07% formaldehyde. The dehydrated castor oil coated strand is dried for 4.8 minutes at 150° F. taken up on a drum 40 inches in diameter and subsequently cut into 5-foot lengths.

A bundle of the collagen sutures so obtained is wrapped in a container as described in Example II above, and stored at 75° F. and 40–45% relative humidity for one week. The sutures are then treated with warm water by immersing the entire bundle in water maintained at a temperature of 30° C. for 3 minutes. The warm water treated bundle of sutures is dried by slowly heating in an oven from room temperature to 137° C. over a period of 8 hours. The dried sutures are then heat set in the oven for another hour at 137° C. The physical properties of the product so obtained are summarized in Table II.

|   | Parts |
|---|---|
| $Cr_2(SO_4)_3 \cdot XH_2O$ (18–21% Cr) | 897.28 |
| NaOH | 103.19 |
| Pyrogallic acid | 45.42 |
| Water qv. | 22,711.80 |

The collagen tape is dried as it leaves the tanning bath and wet out prior to twisting with an aqueous solution containing 1.5% sodium carboxymethylcellulose and 0.10% formaldehyde. The wet tape is false twisted while wet to form a round strand that is dried at 125° F. for 5.7 minutes. This strand is then finished by immersing for 49 seconds in an aqueous emulsion of 0.95% dehydrated castor oil; 0.24% gelatin; and 0.07% formaldehyde. The dehydrated castor oil coated strand is dried for 3.4 minutes at 150° F. taken up on a drum 40 inches in diameter and subsequently cut into 5-foot lengths.

A bundle of the collagen suture strands is wrapped in a container as described in Example II above and stored at 75° F. and 40–45% relative humidity for one to two weeks. The sutures are then treated with warm water by immersing the entire bundle in water maintained at a temperature of 50° C. for 20 minutes. The bundle of strands is removed from the water water and dried in an oven by heating from room temperature to 137° C. over a period of 8 hours. The bundle of sutures is maintained at a temperature of 137° C. for a period of one hour, and then permitted to cool to room temperature. The physical properties of the product so obtained are summarized in Table IV.

TABLE IV

| Experiment No. | Number strands in sample | Diameter (mils) | Dry knot (pounds) | Wet knot (pounds) | Tensile strength | Young's modulus ($\times 10^{-5}$ p.s.i.) | Plastic flow ($\times 10^{-5}$ p.s.i.) | Yield stress ($\times 10^{-5}$ p.s.i.) |
|---|---|---|---|---|---|---|---|---|
| 1 | 120 | 15.70 | 5.41 | 4.88 | 14.74 | 3.8 | 0.7 | 5.6 |
| 2 | 40 | 15.61 | 5.69 | 4.48 | 13.60 |   |   |   |
| 3 | 24 | 15.59 | 5.77 | 5.04 |   | 3.6 | 0.7 | 4.8 |
| 4 | 120 | 15.77 | 5.33 | 4.32 | 9.51 | 3.5 | 0.6 | 5.0 |
| 5 | 120 | 15.71 | 5.24 | 4.96 | 14.71 | 3.1 | 0.7 | 4.4 |
| Average of 5 experiments | | 15.69 | 5.49 | 4.74 | 13.14 | 3.1 | 0.7 | 4.4 |
| Catgut | | 15.67 | 5.82 | 4.55 | 10.80 | 3.6 | 0.7 | 5.1 |

EXAMPLE V

A size 2/0 collagen tape containing 192 individual filaments is plain tanned in accordance with the general

TABLE III

| Experiment No. | Number strands in sample | Diameter (mils) | Dry knot (pounds) | Wet knot (pounds) | Young's modulus ($\times 10^{-5}$ p.s.i.) | Plastic flow ($\times 10^{-5}$ p.s.i.) | Yield stress ($\times 10^{-5}$ p.s.i.) |
|---|---|---|---|---|---|---|---|
| 1 | 50 | 12.69 | 3.29 | 2.40 | 4.20 | 2.15 | 4.5 |
| Catgut | | 12.22 | 3.80 | 2.69 | 4.1 | 1.7 | 5.6 | procedure described in Example III above by immersing the tape for 1 minute in a solution containing 1.0% β-resorcylic acid and 0.75% aluminum formo acetate having the following composition:

|  | Parts |
|---|---|
| Methanol | 150.00 |
| β-Resorcylic acid | 19.93 |
| Aluminum formo acetate | 1.42 |
| Sodium formo sulfoxylate | 0.95 |
| Disodium ethylenediaminetetraacetic acid | 0.95 |
| Water qv. | 2032.00 |

Collagen tape is dried as it leaves the tanning bath and wet out prior to twisting with an aqueous solution containing 1.5% sodium carboxymethylcellulose and 0.24% formaldehyde. The wet tape is false twisted to form a round strand, wet out again in an aqueous solution containing 0.24% formaldehyde and dried at 125° F. for 4.8 minutes. This strand is then finished by immersing for 49 seconds in an aqueous emulsion of 0.95% dehydrated castor oil; 0.20% gelatin; and 0.07% formaldehyde. The dehydrated castor oil coated strand is dried for 4.8 minutes at 150° F. taken up on a drum 40 inches in diameter and subsequently cut into 5-foot lengths.

A bundle of the collagen strands so obtained is wrapped in a container as described in Example II above, and stored at 75° F. and 40–45% relative humidity for one week. The strands are then treated with warm water by immersing the entire bundle in water maintained at a temperature of 30° C. for 3 minutes. The warm water treated bundle of strands is dried by slowly heating in an oven from room temperature to 125° C. over a period of 8 hours. The dried strands are then heat set in the oven for another hour at 125° C. The physical properties of the product so obtained are summarized in Table V.

49 seconds in an aqueous emulsion of 0.95% dehydrated castor oil; 0.24% gelatin; and 0.07% formaldehyde. The dehydrated castor oil coated strand is dried for 4.8 minutes at 150° F. taken up on a drum 40 inches in diameter and subsequently cut into 5-foot lengths.

A bundle of the collagen suture strands so obtained is wrapped in a container as described in Example II above, and stored at 75° F. and 40–45% relative humidity for one week.

The sutures are then treated with warm water by immersing the entire bundle in water maintained at a temperature of 50° C. for 20 minutes. The warm water treated bundle of sutures is dried by slowly heating in an oven from room temperature to 137° C. over a period of 8 hours. The dried strands are then heat set in the oven for another hour at 137° C. The physical properties of the product so obtained are summarized in Table VI.

TABLE VI

| Experiment No. | Number strands in sample | Diameter (mils) | Dry knot (pounds) | Wet knot (pounds) | Tensile strength | Young's modulus ($\times 10^{-5}$ p.s.i.) | Plastic flow ($\times 10^{-5}$ p.s.i.) | Yield stress ($\times 10^{-5}$ p.s.i.) |
|---|---|---|---|---|---|---|---|---|
| 1 | 80 | 19.10 | 7.64 | 7.03 | 0 | 3.5 | 0.7 | 5.1 |
| 2 | 80 | 19.01 | 7.96 | 6.73 | 15.13 | 3.6 | 0.7 | 5.0 |
| 3 | 120 | 18.82 | 7.52 | 7.25 | 20.94 | 3.4 | 0.6 | 5.1 |
| 4 | 120 | 19.10 | 7.51 | 6.60 | 15.23 | 3.1 | 0.7 | 4.4 |
| Average of 4 experiments | | 19.01 | 7.66 | 6.90 | 17.10 | 3.4 | 0.7 | 4.9 |
| Catgut | | 18.76 | 8.15 | 6.66 | 16.50 | 4.2 | 0.6 | 6.5 |

EXAMPLE VII

A size O collagen tape containing 279 individual filaments is plain tanned in accordance with the general procedure described in Example III above by immersing the tape for 1 minute in a solution containing 1.0% β-resorcylic acid and 0.75% aluminum formo acetate having the following composition:

|  | Parts |
|---|---|
| Methanol | 151.00 |
| β-Resorcylic acid | 19.93 |
| Aluminum formo acetate | 1.42 |
| Sodium formo sulfoxylate | 0.95 |
| Disodium ethylenediaminetetraacetic acid | 0.95 |
| Water qv. | 2032.00 |

Collagen tape is dried as it leaves the tanning bath and wet out prior to twisting with an aqueous solution con-

TABLE V

| Experiment No. | Number strands in sample | Diameter (mils) | Dry knot (pounds) | Wet knot (pounds) | Young's modulus ($\times 10^{-5}$ p.s.i.) | Plastic flow ($\times 10^{-5}$ p.s.i.) | Yield stress ($\times 10^{-5}$ p.s.i.) |
|---|---|---|---|---|---|---|---|
| 1 | 50 | 15.95 | 4.71 | 3.61 | 2.37 | 0.72 | 2.5 |
| Catgut | | 15.63 | 5.83 | 4.48 | 4.1 | 1.7 | 5.6 |

EXAMPLE VI

A size 0 collagen tape containing 279 individaul filaments is chrome tanned in accordance with the general procedure described in Example II above by immersing the tape for 1 minute in a solution containing 0.14% pyrogallol and 1.3% chromium as chromic oxide having the following composition:

|  | Parts |
|---|---|
| $Cr_2(SO_4)_3 \cdot X\ H_2O$ (18%–21% Cr) | 1060.49 |
| NaOH | 121.96 |
| Pyrogallic acid | 31.92 |
| Water qv. | 22,711.80 |

Collagen tape is dried as it leaves the tanning bath and wet out prior to twisting with an aqueous solution containing 1.5% sodium carboxymethylcellulose and 0.15% formaldehyde. The wet tape is false twisted to form a round strand that is dried at 125° F. for 4.8 minutes. This strand is then finished by immersing for taining 1.5% sodium carboxymethylcellulose and 0.5% formaldehyde. The wet tape is false twisted to form a round strand, wet out again in an aqueous solution containing 0.5% formaldehyde and dried at 125° F. for 4.8 minutes. This strand is then finished by immersing for 49 seconds in an aqueous emulsion of 0.95% dehydrated castor oil; 0.20% gelatin; and 0.07% formaldehyde. The dehydrated castor oil coated strand is dried for 4.8 minutes at 150° F. taken up on a drum 40 inches in diameter and subsequently cut into 5-foot lengths.

A bundle of the collagen suture so obtained is wrapped in a container as described in Example II above, and stored at 75° F. and 40–45% relative humidity for one week. The sutures are then treated with warm water by immersing the entire bundle in water maintained at a temperature of 25° C. for 4 minutes. The warm water treated bundle of sutures is dried by slowly heating in an oven from room temperature to 125° C. over a period of 8 hours. The dried sutures are then heat set in the oven for another hour at 125° C. The physical properties of the product so obtained are summarized in Table VII.

TABLE VII

| Experiment No. | Number strands in sample | Diameter (mils) | Dry knot (pounds) | Wet knot (pounds) | Young's modulus (×10⁻⁵ p.s.i.) | Plastic flow (×10⁻⁵ p.s.i.) | Yield stress (×10⁻⁵ p.s.i.) |
|---|---|---|---|---|---|---|---|
| 1 | 50 | 19.87 | 7.09 | 5.51 | 2.61 | 0.72 | 2.9 |
| Catgut | | 18.64 | 8.17 | 6.01 | 4.1 | 1.0 | 5.6 |

EXAMPLE VIII

A size 1 collagen tape containing 382 individual filaments is chrome tanned in accordance with the general procedure described in Example I of U.S. Pat. No. 3,166,074 by immersing the tape for 1.5 minutes in a solution containing 0.14% by weight pyrogallol and 1.1% by weight chromium (as $Cr_2O_3$) having the following composition:

| | Parts |
|---|---|
| $Cr_2(SO_4)_3 \cdot XH_2O$ (18–21% Cr) | 879.28 |
| NaOH | 103.19 |
| Pyrogallic acid | 31.92 |
| Water qv. | 22,711.80 |

The collagen tape is dried as it leaves the tanning bath and wet out prior to twisting with an aqueous solution containing 1.5% sodium carboxymethylcellulose and 0.15% formaldehyde. The wet tape is false twisted to form a round strand that is dried at 125° F. for 4.8 minutes. This strand is then finished by immersing for 1.9 minutes in an aqueous emulsion of 0.95% dehydrated castor oil; 0.24% gelatin; and 0.07% formaldehyde. The dehydrated castor oil coated strand is dried for 4.8 minutes at 150° F. taken up on a drum 40 inches in diameter cut into 5-foot lengths, and immersed in warm water maintained at 50° C. as described in Example II above. After 30 minutes in the warm water bath, the suture strands are removed and slowly heated from room temperature to 137° C. over a period of eight hours. The strands are maintained at 137° C. for an additional hour and then permitted to cool to room temperature. The

| | Parts |
|---|---|
| Methanol | 151.00 |
| β-Resorcylic acid | 19.93 |
| Aluminum formo acetate | 1.42 |
| Sodium formo sulfoxylate | 0.95 |
| Disodium ethylenediaminetetraacetic acid | 0.95 |
| Water qv. | 2032.00 |

Collagen tape is dried as it leaves the tanning bath and wet out prior to twisting with an aqueous solution containing 1.5% sodium carboxymethylcellulose and 0.62% formaldehyde. The wet tape is false twisted to form a round strand, wet out again in an aqueous solution containing 0.62% formaldehyde and dried at 125° F. for 4.8 minutes. This strand is then finished by immersing for 49 seconds in an aqueous emulsion of 0.95% dehydrated castor oil; 0.20% gelatin; and 0.07% formaldehyde. The dehydrated castor oil coated strand is dried for 4.8 minutes at 150° F. taken up on a drum 40 inches in diameter and subsequently cut into 5-foot lengths.

A bundle of the collagen sutures so obtained is wrapped in a container as described in Example II above, and stored at 75° F. and 40–45% relative humidity for one week. The sutures are then treated with warm water by immersing the entire bundle in water maintained at a temperature of 25° C. for 4 minutes. The warm water treated bundle of sutures is dried by slowly heating in an oven from room temperature to 125° C. over a period of 8 hours. The dried sutures are then heat set in the oven for another hour at 125° C. The physical properties of the product so obtained are summarized in Table IX.

TABLE IX

| Experiment No. | Number strands in sample | Diameter (mils) | Dry knot (pounds) | Wet knot (pounds) | Young's modulus (×10⁻⁵ p.s.i.) | Plastic flow (×10⁻⁵ p.s.i.) | Yield stress (×10⁻⁴ p.s.i.) |
|---|---|---|---|---|---|---|---|
| 1 | 50 | 23.39 | 8.45 | 6.98 | 2.76 | 0.70 | 4.4 |
| 2 | 80 | 19.01 | 7.96 | 6.73 | | | |
| 3 | 120 | 18.82 | 7.52 | 7.25 | | | |
| 4 | 120 | 19.10 | 7.51 | 6.60 | 3.1 | 0.7 | 4.4 |
| Catgut | | 21.94 | 10.8 | 1.11 | 3.6 | 1.0 | 5.6 | physical properties of the product so obtained is summarized in Table VIII.

TABLE VIII

| Experiment No. | Number strands in sample | Diameter (mils) | Dry knot (pounds) | Wet knot (pounds) | Tensile strength | Young's modulus (×10⁻⁵ p.s.i.) | Plastic flow (×10⁻⁵ p.s.i.) | Yield stress (×10⁻⁵ p.s.i.) |
|---|---|---|---|---|---|---|---|---|
| 1 | 24 | 22.93 | 9.89 | 9.33 | 23.76 | 3.5 | 0.6 | 5.8 |
| 2 | 120 | 22.89 | 10.04 | 8.72 | 22.61 | 3.6 | 0.6 | 5.4 |
| 3 | 120 | 22.80 | 10.02 | 8.70 | 22.83 | 3.4 | 0.7 | 5.7 |
| 4 | 120 | 22.77 | 10.20 | 8.93 | 28.01 | 3.0 | 0.7 | 4.9 |
| Average of 4 experiments | | 22.85 | 10.04 | 8.92 | 24.30 | 3.4 | 0.7 | 5.5 |
| Catgut | | 22.02 | 10.67 | 9.12 | 21.98 | 4.2 | 0.6 | 7.6 |

EXAMPLE IX

A size 1 collagen tape containing 382 individual filaments is plain tanned in accordance with the general procedure described in Example III above above by immersing the tape for 1 minute in a solution containing 1.0% β-resorcylic acid and 0.75% aluminum formo acetate having the following composition:

EXAMPLE X

A size 2 collagen tape containing 499 individual filaments is tanned in accordance with the general procedure described in Example I of U.S. Pat. No. 3,166,074 by immersing the tape for 1.7 minutes in a solution having the composition indicated in Example VIII above.

The collagen tape is dried as it leaves the tanning bath and wet out prior to twisting with an aqueous solution containing 1.5% sodium carboxymethylcellulose and 0.15% formaldehyde. The wet tape is false twisted to form a round strand that is dried at 125° F. for 4.8 minutes. This strand is then finished by immersing for 3 minutes in an aqueous emulsion of 0.95% dehydrated castor oil; 0.24% gelatin; and 0.07% formaldehyde. The dehydrated castor oil coated strand is dried for 4.8 minutes at 150° F. taken up on a drum 40 inches in diameter and subsequently cut into five foot lengths. The collagen sutures so obtained are immersed in water heated to 50° C. for 30 minutes, dried, and heat set as described in Example VIII above. The physical properties of the product so obtained are summarized in Table X.

TABLE XI

| Experiment No. | Number strands in sample | Diameter (mils) | Dry knot (pounds) | Wet knot (pounds) | Young's modulus ($\times 10^{-5}$ p.s.i.) | Plastic flow ($\times 10^{-5}$ p.s.i.) | Yield stress ($\times 10^{-3}$ p.s.i.) |
|---|---|---|---|---|---|---|---|
| 1 | 80 | 26.53 | 10.94 | 8.54 | 3.24 | 0.81 | 5.3 |
| 2 | 80 | 19.01 | 7.96 | 6.73 | 3.6 | 0.7 | 5.0 |
| 3 | 120 | 18.82 | 7.52 | 7.25 | 3.4 | 0.6 | 5.1 |
| 4 | 120 | 19.10 | 7.51 | 6.60 | 3.1 | 0.7 | 4.4 |
| Average of 4 experiments | | 19.01 | 7.66 | 6.90 | 3.4 | 0.7 | 4.9 |
| Catgut | | 24.79 | 14.2 | 10.3 | 3.6 | 1.0 | 5.6 | of 8 hours. The dried sutures are then heat set in the oven for another hour at 125° C. The physical properties of the product so obtained are summarized in Table XI.

EXAMPLE XII

It has been noted that the treatment of a tanned extruded collagen suture with warm water results in a decrease in Young's Modulus, yield stress, and plastic flow. A low plastic flow value is desirable for optimum extensibility, and facilitates straightening the suture upon removal from the package. The data summarized in Table XII shows that the plastic flow of a warm water treated suture may be further reduced with little increase in Young's Modulus by heating the suture for 1 hour at a temperature in the range of 110° C. to 137° C. (heat setting the suture).

TABLE X

| Experiment No. | Number strands in sample | Diameter (mils) | Dry knot (pounds) | Wet knot (pounds) | Tensile strength | Young's modulus ($\times 10^{-5}$ p.s.i.) | Plastic flow ($\times 10^{-5}$ p.s.i.) | Yield stress ($\times 10^{-3}$ p.s.i.) |
|---|---|---|---|---|---|---|---|---|
| 1 | 40 | 26.10 | 12.72 | 10.88 | 20.80 | 4.5 | 0.6 | 8.4 |
| 2 | 24 | 25.99 | 13.03 | 11.04 | 0 | 4.3 | 0.75 | 7.6 |
| 3 | 80 | 25.91 | 12.32 | 10.91 | 24.48 | 4.1 | 0.65 | 7.5 |
| 4 | 120 | 26.36 | 13.16 | 11.75 | 30.00 | 3.9 | 0.65 | 6.9 |
| Average of 4 experiments | | 26.09 | 12.81 | 11.15 | 25.09 | 4.2 | 0.7 | 7.6 |
| Catgut | | 24.99 | 13.68 | 12.30 | 25.04 | 5.1 | 0.6 | 10.0 |

EXAMPLE XI

A size 2 collagen tape containing 499 individual filaments is plain tanned in accordance with the general procedure described in Example II above by immersing the tape for 1 minute in a solution containing 1.0% β-resorcylic acid and 0.75% aluminum formo acetate having the following composition:

| | Parts |
|---|---|
| Methanol | 151 |
| β-Resorcylic acid | 19.93 |
| Aluminum formo acetate | 1.42 |
| Sodium formo sulfoxylate | 0.95 |
| Disodium ethylene-diamine tetraacetic acid | 0.95 |
| Water qv. | 2032.00 |

Collagen tape is dried as it leaves the tanning bath and wet out prior to twisting with an aqueous solution containing 1.5% sodium carboxymethylcellulose and 0.70% formaldehyde. The wet tape is false twisted to form a round strand, wet out again in an aqueous solution containing 0.20% formaldehyde and dried at 125° F. for 4.8 minutes. This strand is then finished by immersing for 49 seconds in an aqueous emulsion of 0.95% dehydrated castor oil; 0.20% gelatin; and 0.70% formaldehyde. The dehydrated castor oil coated strand is dried for 4.8 minutes at 150° F. taken up on a drum 40 inches in diameter and subsequently cut into 5-foot lengths.

A bundle of the collagen sutures so obtained is wrapped in a container as described in Example II above, and stored at 75° F. and 40–45% relative humidity for one week. The sutures are then treated with warm water by immersing the entire bundle in water maintained at a temperature of 30° C. for 4 minutes. The warm water treated bundle of sutures is dried by slowly heating in an oven from room temperature to 125° C. over a period

TABLE XII.—SIZE 0 CHROME TANNED

| Treatment | Young's modulus $\times 10^{-5}$ p.s.i. | Plastic flow $\times 10^{-5}$ p.s.i. | Yield stress $\times 10^{-3}$ p.s.i. |
|---|---|---|---|
| Untreated | 4.23 | 2.50 | 4.8 |
| Water, 20 minutes at 50° C | 3.68 | 1.86 | 4.2 |
| Heat 137° C., 1 hour | 4.64 | 1.17 | 6.2 |
| Water, 20 minutes at 50° C and Heat 110° C., 1 hour | 4.18 | 0.97 | 6.1 |
| Water, 20 minutes at 50° C and Heat 125° C., 1 hour | 4.25 | 0.87 | 6.0 |
| Water 20 minutes at 50° C and Heat 137° C., 1 hour | 4.21 | 0.78 | 5.8 |
| Water 20 minutes at 50° C and Heat 149° C., 1 hour | 4.27 | 0.61 | 6.3 |

What is claimed is:

1. A method of improving the pliability of an extruded and stretched tanned collagen suture having a size within the range of 3/0 to 2 comprising the steps of:
   immersing the suture in an aqueous medium at a temperature below about 65° C. for a time sufficient to shrink the suture not less than about 2% or more than about 6% of its initial length;
   removing said suture from the aqueous medium;
   drying the water treated suture; and
   heating the dried suture at a temperature within the range of from about 110° C. to about 149° C. for about an hour.

2. Method of claim 1 wherein the water treated suture is dried by heating in an oven.

3. A method of improving the pliability of an extruded and stretched chrome tanned size 3/0 collagen suture which comprises the steps of:
   immersing the suture in water at a temperature below about 65° C. for a time sufficient to shrink the suture about 3% of its initial length;
removing said suture from the water;
drying the water treated suture; and
heating the dried suture at a temperature within the range of from about 110° C. to about 149° C. for about an hour.

4. The method of claim 3 wherein the suture is immersed in warm water maintained at about 50° C. for about 20 minutes.

5. The method of improving the pliability of an extruded and stretched plain tanned size 3/0 collagen suture which comprises the steps of:
immersing the suture in water at a temperature below about 65° C. for a time sufficient to shrink the suture about 4% of its initial length;
removing said suture from the water;
drying the water treated suture; and
heating the dried suture at a temperature within the range of from about 110° C. to about 137° C. for about an hour.

6. The method of claim 5 wherein the suture is immersed in warm water maintained at about 30° C. for about 3 minutes.

7. A method of improving the pliability of an extruded and stretched chrome tanned size 2/0 collagen suture which comprises the steps of:
immersing the suture in water at a temperature below about 65° C. for a time sufficient to shrink the suture about 3% of its initial length;
removing said suture from the water;
drying the water treated suture; and
heating the dried suture at a temperature within the range of from about 110° C. to about 149° C. for about an hour.

8. The method of claim 7 wherein the suture is immersed in warm water maintained at about 50° C. for about 20 minutes.

9. The method of improving the pliability of an extruded and stretched plain tanned size 2/0 collagen suture which comprises the steps of:
immersing the suture in water at a temperature below about 65° C. for a time sufficient to shrink the suture about 4% of its initial length;
removing said suture from the water;
drying the water treated suture; and
heating the dried suture at a temperature within the range of from about 110° C. to about 137° C. for about an hour.

10. The method of claim 9 wherein the suture is immersed in warm water maintained at about 30° C. for about 3 minutes.

11. A method of improving the pliability of an extruded and stretched chrome tanned size 0 collagen suture which comprises the steps of:
immersing the suture in water at a temperature below about 65° C. for a time sufficient to shrink the suture about 3% of its initial length;
removing said suture from the water;
drying the water treated suture; and
heating the dried strand at a temperature within the range of from about 110° C. to about 149° C. for about an hour.

12. The method of claim 11 wherein the suture is immersed in warm water maintained at about 50° C. for about 20 minutes.

13. The method of improving the pliability of an extruded and stretched plain tanned size 0 collagen suture which comprises the steps of:
immersing the suture in water at a temperature below about 65° C. for a time sufficient to shrink the suture about 4% of its initial length;
removing said suture from the water;
drying the water treated suture; and
heating the dried suture at a temperature within the range of from about 110° C. to about 137° C. for about an hour.

14. The method of claim 13 wherein the suture is immersed in warm water maintained at about 25° C. for about 4 minutes.

15. A method of improving the pliability of an extruded and stretched chrome tanned size 1 collagen suture which comprises the steps of:
immersing the suture in water at a temperature below about 65° C. for a time sufficient to shrink the suture about 3% of its initial length;
removing said suture from the water;
drying the water treated suture; and
heating the dried suture at a temperature within the range of from about 110° C. to about 149° C. for about an hour.

16. The method of claim 15 wherein the suture is immersed in warm water maintained at about 50° C. for about 30 minutes.

17. The method of improving the pliability of an extruded and stretched plain tanned size 1 collagen suture which comprises the steps of:
immersing the suture in warm water at a temperature below about 65° C. for a time sufficient to shrink the suture about 4% of its initial length;
removing said suture from the water;
drying the water treated suture; and
heating the dried suture at a temperature within the range of from about 110° C. to about 137° C. for about an hour.

18. The method of claim 17 wherein the suture is immersed in warm water maintained at about 25° C. for about 4 minutes.

19. A method of improving the pliability of an extruded and stretched chrome tanned size 2 collagen suture which comprises the steps of:
immersing the suture in warm water at a temperature below about 65° C. for a time sufficient to shrink the suture about 3% of its initial length;
removing said suture from the water;
drying the water treated suture; and
heating the dried strand at a temperature within the range of from about 110° C. to about 149° C. for about an hour.

20. The method of claim 19 wherein the suture is immersed in warm water maintained at about 50° C. for about 30 minutes.

21. The method of improving the pliability of an extruded and stretched plain tanned size 2 collagen suture which comprises the steps of:
immersing the suture in water at a temperature below about 65° C. for a time sufficient to shrink the suture about 4% of its initial length;
removing said suture from the water;
drying the water treated suture; and
heating the dried suture at a temperature within the ranges of from about 110° C. to about 137° C. for about an hour.

22. The method of claim 21 wherein the suture is immersed in warm water maintained at about 30° C. for about 4 minutes.

References Cited

UNITED STATES PATENTS

| | | | |
|---|---|---|---|
| 3,093,440 | 6/1963 | Bothwell | 8—94.11 |
| 3,435,825 | 4/1969 | Thoennes | 8—94.11 |
| 3,408,805 | 11/1968 | Reeder et al. | 128—335.5 |
| 3,413,079 | 11/1968 | Rich | 8—94.11 |

ROBERT T. WHITE, Primary Examiner

G. AUVILLE, Assistant Examiner

U.S. Cl. X.R.

8—94.2; 128—335.5; 264—202, 340

UNITED STATES PATENT OFFICE
CERTIFICATE OF CORRECTION

Patent No. 3,651,204      Dated March 21, 1972

Inventor(s) Joseph Nichols and Frederick Sexsmith

It is certified that error appears in the above-identified patent and that said Letters Patent are hereby corrected as shown below:

In Column 1, line 68, " tensile length " should read ---- initial length ----.

In Column 6, line 44, " from the water water and dried " should read ---- from the warm water and dried -- .

In Column 9, line 72, " Example 111, above above by " should read ----Example 111, above by ----.

Signed and sealed this 26th day of December, 1972

(SEAL)
Attest:

EDWARD M. FLETCHER, JR.
Attesting Officer

ROBERT GOTTSCHALK
Commissioner of Patents